UNITED STATES PATENT OFFICE.

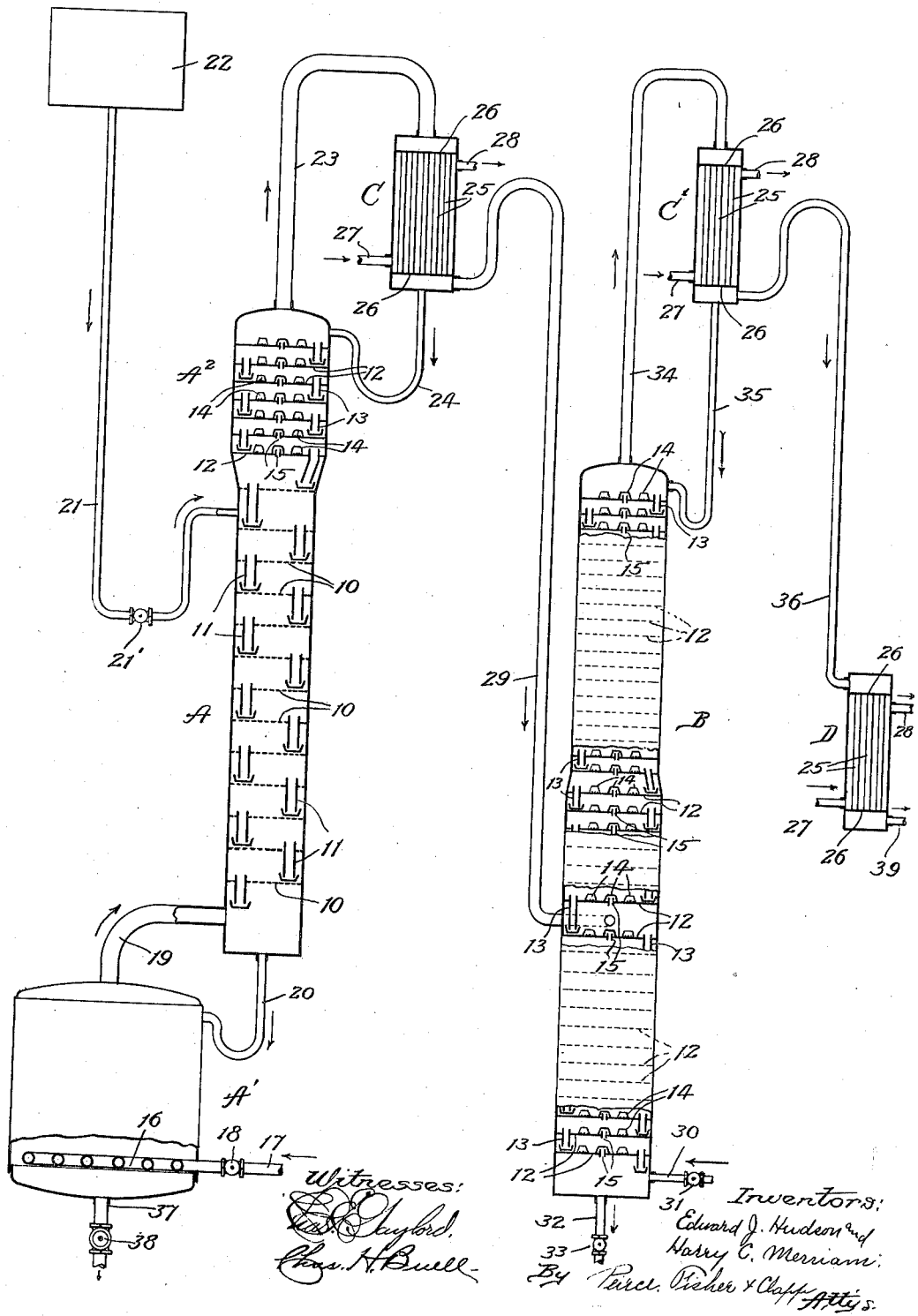

EDWARD J. HUDSON AND HARRY C. MERRIAM, OF MARQUETTE, MICHIGAN, ASSIGNORS OF ONE-HALF TO THE CLEVELAND-CLIFFS IRON COMPANY, OF CLEVELAND, OHIO, A CORPORATION OF WEST VIRGINIA.

PROCESS OF DISTILLATION AND APPARATUS THEREFOR.

1,303,321.    Specification of Letters Patent.    Patented May 13, 1919.

Application filed February 7, 1917. Serial No. 147,228.

*To all whom it may concern:*

Be it known that we, EDWARD J. HUDSON and HARRY C. MERRIAM, citizens of the United States, and residents of Marquette, county of Marquette, and State of Michigan, have invented certain new and useful Improvements in Processes of Distillation and Apparatus Therefor, of which the following is a specification.

The invention relates to distillation processes and apparatus, and more particularly to such as are designed for the treatment of the liquor derived from the destructive distillation of wood. This liquor, or "crude wood vinegar" as it is termed, consists chiefly of acetic acid, wood spirit or methyl alcohol, oils and a considerable quantity of water. After neutralization with milk of lime, the liquor is distilled to drive off the wood spirit and the residue in the still is evaporated to produce commercial acetate of lime. Usually the distillate must be re-distilled and rectified to purify the wood spirit or methyl alcohol. The distillation of the neutralized liquor has also been carried out in a column still having rectifying means for producing wood alcohol of high strength and free from water without redistillation. But in such cases, the water remains in the still and dilutes the calcium acetate solution so that considerable fuel must thereafter be expended in evaporating it.

The present invention seeks to provide an improved method and apparatus for distilling the neutralized wood liquor which will produce, at a single operation, wood alcohol of high strength and calcium acetate solution free from a considerable portion of the water originally present in the liquor.

The apparatus preferably employed for carrying out the present improved process is illustrated in the accompanying drawing and comprises a combined column still and rectifier A and a second rectifying column B. The dimensions and details of the apparatus can be varied in accordance with different conditions and the desired capacity. In the construction shown, the lower end of the distilling column A communicates with a cylindrical closed tank or still proper A' which is approximately nine feet in diameter and nine feet high. The main portion of the distilling column A is approximately twenty-two feet high and thirty-six inches in diameter and is provided with thirteen perforated sieve plates 10 having overflow pipes 11. The distilling column A is provided with an enlarged upper rectifying portion $A^2$ which is approximately eight feet in height and forty-two inches in diameter and is provided with seven washing cup plates 12 having drip pipes 13 and a number of cups 14 which are set over nipples 15 passing through the plates. The cups are provided, as usual, with serrated lower edges and there are preferably approximately twenty cups to each plate.

The rectifying column B is somewhat larger than the distilling column A and is set somewhat lower as indicated. The lower portion of the rectifying column is approximately nineteen feet high and forty-six inches in diameter and is provided with twenty cup plates having preferably twenty-six cups on each plate. The upper portion of the rectifying column B is approximately fifteen feet high and forty-two inches in diameter and is provided with nineteen cup plates with twenty cups on each plate. As stated, the dimensions noted can be varied to suit different conditions and the desired capacity, those given being suitable for an apparatus designed to treat about thirty-five thousand gallons of neutralized liquor in twenty-four hours. Both columns are constructed, as usual, of cast metal sections superposed upon one another.

The still tank A' is provided at its lower portion with a heating coil 16 which connects with a steam supply pipe 17 having a valve 18 therein. The upper portion of the still tank is connected to the lower end of the distilling column by a large pipe 19 through which vapor passes from the tank or still proper into the lower end of the column, and the lower end of the distilling column is also connected to the upper portion of the tank by a relatively small pipe 20 for the passage of liquor from the distilling column into the tank.

The neutralized liquor is fed into the distilling column through a pipe 21, having a valve 21' therein, which leads from a supply tank 22 and opens into the distilling column at a point between the two upper sieve plates 10. The feed tank 22 is preferably elevated as shown, some distance above the distilling column. The upper end of the distilling column communicates by means of a large vapor pipe 23 and a relatively small return liquor pipe 24 with the upper and lower ends respectively of a reflux condenser C. This condenser is placed slightly above the upper end of the distilling column and may be of any suitable construction. That shown, comprises a series of condensing tubes 25 connected to heads 26 adjacent the upper and lower ends of the condenser and adapted to be surrounded by cooling water which is admitted to the lower end of the condenser to an inlet pipe 27 and passes from the upper portion thereof through an exit pipe 28.

A large vapor pipe 29 leads from the lower end of the reflux condenser C and opens into the lower portion of the rectifying column B at a point above the base of the column. In the construction shown, the vapor inlet of the rectifying column B is so located that there are thirteen cup plates below the same. The extreme lower end of the rectifying column is provided with a steam supply pipe 30 having a regulating valve 31 and is also provided with an exit pipe 32 having a valve 33 therein.

The extreme upper end of the rectifying column communicates by a large vapor pipe 34 and a relatively small liquor pipe 35 with the upper and lower ends respectively of a reflux condenser C' similar in construction but somewhat smaller than the condenser C. A vapor pipe 36 leads from the lower end of the reflux condenser C' to a refrigerator D which is similar in construction to the reflux condensers C and C' and in which the rectified wood spirit is liquefied.

The apparatus is continuous in its operation, the vapor and liquid flowing through the pipes as indicated by arrows in the drawing. The pipes 20, 21, 24 and 35 through which liquid flows are provided with U-shaped bends, and the vapor pipes 23, 29, 34 and 36 are provided with inverted U-bends. In operation, the neutralized wood liquor is continuously admitted into the upper portion of the distilling column A in sufficient quantity to properly cover the sieve plates 10 and flows downwardly therethrough and through the pipe 20 into the tank or still proper 'A' where it is heated by steam supplied by the coil 16. The vapors pass upwardly through the distilling column, heat the liquor descending therethrough and effect the evaporation of the contained alcohol. The column still is so proportioned and the liquor is admitted at such a point above its base, that when the liquor reaches the lower end of the distilling column and passes into the tank A', it is deprived of practically all of the alcohol and oils originally contained therein and a considerable portion of the water. The acetate of lime solution thus concentrated is drawn off from the bottom of the tank A' through a pipe 37 having a regulating valve 38. The vapors passing through the upper portion $A^2$ of the distilling column and to the reflux condenser C are initially rectified by fractional condensation, sufficient vapor being liquefied in the condenser C and returned to the upper end of the distilling column by the pipe 24 to properly cover the cup plates 12 and thereby wash the vapor passing upwardly therethrough.

In usual practice, the operation of the combined column, still and rectifier A is so regulated that the dilute alcohol vapor passing from the reflux condenser C by the pipe 29 into the second or main rectifying column B contains from fifteen to twenty-five per cent. of alcohol and two to three per cent. of oils, the remainder being aqueous vapor. The vapor passing upwardly through the rectifying column B and the reflux condenser C' is thoroughly rectified by fractional condensation and deprived of the aqueous vapor and oils so that wood alcohol of high strength, say ninety-eight or ninety-nine per cent., passes into the refrigerator D and is there liquefied and drawn off through the pipe 39. Sufficient vapor is liquefied in the condenser C' and returned to the upper end of the rectifying column B through the pipe 35 to keep the cup plates therein properly covered and sealed. A small quantity of steam is injected into the extreme lower end of the rectifying column through the pipe 30 and the supply is regulated by the valve 31 therein. The vapor inlet is located at such a point above the base of the rectifying column (in the form shown, there are thirteen cup plates below the vapor inlet) and the steam supply introduced at the lower end of the column is so regulated that when the liquor or condensate reaches the lower end of the column it has been deprived of all its alcohol and is drawn off through the exit pipe 32. This condensate consists largely of water with a small quantity of oil. The latter can be separated from the water by gravity.

By employing the improved method and apparatus as described, wood alcohol of high strength can be obtained by direct distillation from neutralized, crude wood vinegar and, at the same time, the acetate solution is deprived of a considerable portion of its water and considerable saving is thereby effected in the cost of subsequently evaporating it.

The details set forth can be varied without departure from the essentials of the invention as defined in the claims.

We claim as our invention:—

1. The continuous process of producing concentrated acetate solution and high strength, purified wood spirits from neutralized wood liquor, which consists in distilling the liquor to concentrate the acetate solution and drive off vapors containing the alcohol and a relatively large amount of water, rectifying the vapors thus formed by fractional condensation and collecting the resulting aqueous condensate separate from the concentrated acetate solution.

2. The continuous process of producing concentrated acetate solution and high strength, purified wood spirits from neutralized wood liquor, which consists in passing the liquor downwardly through a continuously operating column-still and distilling the same to concentrate the acetate solution and form vapors containing the alcohol, the oil and a relatively large amount of water, passing such vapors through a second rectifying apparatus to separate out the water and the oil by fractional condensation, withdrawing the purified alcohol vapor from the upper end of the rectifying apparatus and separately withdrawing the concentrated acetate solution from the lower end of the still and the condensed water and oil from the lower end of the rectifying apparatus.

3. The process of treating neutralized wood liquor which consists in heating the liquor in a still to concentrate the acetate solution and form dilute alcohol vapor, introducing the vapor into a rectifying column at a point above the base thereof, introducing a regulated supply of steam into the base of the column and collecting aqueous condensate at the base of the rectifying column substantially free from alcohol and separate from the concentrated acetate solution.

4. The process of treating neutralized wood liquor which consists in heating the same in a still to concentrate the acetate solution and form dilute alcohol vapor, rectifying the vapor by fractional condensation, heating the condensate to vaporize the alcohol therein, commingling the latter with the dilute alcohol vapor from the still for rectification therewith, and collecting the resulting condensate freed from alcohol and separate from the concentrated acetate solution.

5. The process of treating neutralized wood liquor which consists in introducing the same into a combined column still and rectifier at a point above its base, distilling the same and partially rectifying the vapor to concentrate the acetate solution and form dilute alcohol vapor, passing the dilute alcohol vapor through a separate rectifying column to purify the same by fractional condensation, and separately collecting concentrated acetate solution at the base of the still, purified alcohol vapor at the top of the rectifying column, and aqueous condensate at the base of the column.

6. The process of treating neutralized wood liquor which consists in introducing the same into a combined column still and rectifier at a point above its base, distilling the same and partially rectifying the vapor by fractional condensation, to concentrate the acetate solution and form dilute alcohol vapor, returning the resulting condensate to the upper end of the combined still and rectifier, introducing the dilute alcohol vapor into a separate rectifying column at a point above its base, introducing a regulated steam supply into the base of the rectifying column, and collecting aqueous condensate at the base of the rectifying column substantially free from alcohol and separate from the concentrated acetate solution.

7. In the fractionation of a compound liquor containing water, a non-volatile component and a low-boiling component, the process which consists in introducing the liquor into a combined column still and rectifier above the base thereof, distilling the same and partially rectifying the vapor by fractional condensation to concentrate the solution of the non-volatile component and form vapor of the low-boiling component diluted with aqueous vapor, returning the resulting condensate to the upper end of the combined column still and rectifier, introducing the dilute vapor into a rectifying column at a point above the base thereof, introducing a regulated supply of steam into the base of the rectifying column, and separately collecting aqueous condensate at the base of the rectifying column, concentrated solution of the non-volatile component at the base of the still, and purified vapor of the low-boiling component at the upper end of the rectifying column.

8. In a distilling apparatus for treating neutralized wood liquors and the like, the combination of a combined column still and rectifier, a pipe for supplying neutralized wood liquor to the upper portion of said column still, a reflux condenser connected to said rectifier, a separate rectifying column, a pipe for conducting the vapors from said reflux condenser to said rectifying column at a point above the base thereof, means for introducing a regulated supply of steam into the base of said rectifying column, a reflux condenser connected to the top of said rectifying column, an exit pipe for rectified vapors leading from the latter condenser and separate exit pipes for acetate solution and aqueous condensate leading respectively from the base of said still and the base of said rectifying column.

9. In a distilling apparatus for treating neutralized wood liquors and the like, the combination of a column still, a pipe for supplying neutralized wood liquor at a point adjacent but below the top of said still, the latter having a rectifying portion above the connecting point of said inlet pipe, a reflux condenser connected to the rectifying portion of said column still, a column rectifier, a pipe for conducting vapor from said reflux condenser to said rectifier at a point above its base, a pipe for introducing a regulated steam supply into the base of said rectifier, a reflux condenser connected to the top of said column rectifier, a refrigerator connected to said latter condenser, and separate exit pipes for acetate solution and aqueous condensate leading from the base of said still and the base of said rectifier respectively.

EDWARD J. HUDSON.
HARRY C. MERRIAM.